(12) United States Patent
Fly et al.

(10) Patent No.: US 7,592,089 B2
(45) Date of Patent: Sep. 22, 2009

(54) FUEL CELL WITH VARIABLE POROSITY GAS DISTRIBUTION LAYERS

(75) Inventors: Gerald W Fly, Geneseo, NY (US); Brian K Brady, North Chili, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1620 days.

(21) Appl. No.: 10/080,754

(22) Filed: Feb. 22, 2002

(65) Prior Publication Data

US 2002/0114990 A1 Aug. 22, 2002

Related U.S. Application Data

(63) Continuation-in-part of application No. 09/651,934, filed on Aug. 31, 2000, now Pat. No. 6,566,004, and a continuation-in-part of application No. 09/694,386, filed on Oct. 23, 2000, now Pat. No. 6,663,994.

(51) Int. Cl.
  *H01M 8/02* (2006.01)
(52) U.S. Cl. .......................................... 429/38; 429/34
(58) Field of Classification Search ................... 429/39, 429/34, 38, 30
  See application file for complete search history.

(56) References Cited

U.S. PATENT DOCUMENTS

| | | |
|---|---|---|
| 3,856,584 A | 12/1974 | Cina |
| 4,125,676 A | 11/1978 | Maricle et al. |
| 4,129,685 A | 12/1978 | Damiano |
| 4,567,086 A | 1/1986 | Fukuda et al. |
| 4,664,988 A | 5/1987 | Shigeta et al. |
| 4,766,664 A | 8/1988 | Benedyk |

(Continued)

FOREIGN PATENT DOCUMENTS

DE  197 09 571 C1  3/1997

(Continued)

OTHER PUBLICATIONS

International Search Report dated Nov. 29, 2002, Int'l. App. No. PCT/US02/05766.

(Continued)

*Primary Examiner*—Gregg Cantelmo
(74) *Attorney, Agent, or Firm*—Harness, Dickey & Pierce, P.L.C.

(57) ABSTRACT

A fuel cell of the type having a membrane electrode assembly (MEA) interdisposed between a pair of bipolar plate assemblies. The MEA may have a convoluted configuration to maximize the effective surface area of the MEA for a given planar area. Each bipolar plate assembly includes a gas distribution layer of open cell conductive foam material which is divided into a plurality of generally parallel segments to define a plurality of generally parallel porous reactant paths. The segments are defined by selectively varying the porosity of the foam material and/or selectively varying the thickness of the foam material. The foam material may be a conductive graphite foam media or a conductive metallic foam media. Each bipolar plate assembly further includes a non-porous, conductive separator plate. The bipolar plate assembly distributes the reactant gases delivered via a manifold structure across the face of the MEA. A coolant layer may also be provided utilizing a segmented foam construction similar to that utilized in the gas distribution layers.

23 Claims, 7 Drawing Sheets

U.S. PATENT DOCUMENTS

| | | | |
|---|---|---|---|
| 4,826,741 | A | 5/1989 | Aldhart et al. |
| 5,272,017 | A | 12/1993 | Swathirajan et al. |
| 5,316,871 | A | 5/1994 | Swathirajan et al. |
| 5,441,822 | A | 8/1995 | Yamashita et al. |
| 5,508,128 | A | 4/1996 | Akagi |
| 5,618,392 | A | 4/1997 | Furuya |
| 5,620,807 | A | 4/1997 | Mussell et al. |
| 5,635,069 | A | 6/1997 | Boss et al. |
| 5,641,586 | A | 6/1997 | Wilson |
| 5,658,681 | A | 8/1997 | Sato et al. |
| 5,707,755 | A | 1/1998 | Grot |
| 5,776,624 | A | 7/1998 | Neutzler |
| 5,798,187 | A | 8/1998 | Wilson et al. |
| 5,948,185 | A | 9/1999 | Krajewski et al. |
| 6,017,650 | A | 1/2000 | Ramunni et al. |
| 6,024,848 | A | 2/2000 | Dufner et al. |
| 6,037,072 | A | 3/2000 | Wilson et al. |
| 6,037,073 | A | 3/2000 | Besmann et al. |
| 6,054,228 | A | 4/2000 | Cisar et al. |
| 6,083,638 | A | 7/2000 | Taniguchi et al. |
| 6,110,614 | A | 8/2000 | Fellows |
| 6,132,895 | A | 10/2000 | Pratt et al. |
| 6,146,780 | A | 11/2000 | Cisar et al. |
| 6,232,010 | B1 | 5/2001 | Cisar et al. |
| 6,258,476 | B1 | 7/2001 | Cipollini |
| 6,379,833 | B1 | 4/2002 | Hill et al. |
| 2002/0012825 | A1 | 1/2002 | Sasahara et al. |
| 2003/0228512 | A1 | 12/2003 | Vyas et al. |

FOREIGN PATENT DOCUMENTS

| | | |
|---|---|---|
| DE | 197 09 571 | 6/1998 |
| DE | 196 26 342 A1 | 8/1998 |
| JP | 3-167752 | 7/1991 |
| JP | 409245820 A | 9/1997 |
| WO | WO 94/09519 | 10/1992 |
| WO | WO 98/16961 | 10/1997 |
| WO | WO 98/21770 | 11/1997 |
| WO | WO 98/35398 | 8/1998 |
| WO | WO 98/50973 | 11/1998 |
| WO | WO 99/56333 | 4/1999 |
| WO | WO 99/57781 | 4/1999 |
| WO | WO 00/02267 | 7/1999 |
| WO | WO 00/02268 | 7/1999 |
| WO | WO 00/02269 | 7/1999 |
| WO | WO 00/02270 | 7/1999 |
| WO | WO 00/02272 | 7/1999 |
| WO | WO 00/02273 | 7/1999 |
| WO | WO 00/02274 | 7/1999 |
| WO | WO 00/02275 | 7/1999 |
| WO | WO 00/02276 | 7/1999 |
| WO | WO 00/02281 | 7/1999 |
| WO | WO 00/08703 | 2/2000 |
| WO | WO 02/05373 A1 | 1/2002 |

OTHER PUBLICATIONS

International Search Report dated Aug. 28, 2002, Int'l. App. No. PCT/US02/07981.

European Search Report dated Sep. 1, 2003, European App. No. EP 01 11 7392.

Oliver J. Murphy, et al. "Low-cost light weight high power density PEM fuel cell stack" Electrochimica Acta, Elsevier Science Ltd., vol. 43, No. 24, Aug. 21, 1998, pp. 3829-3840.

FUEL CELL WITH VARIABLE POROSITY GAS DISTRIBUTION LAYERS

CROSS-REFERENCE TO RELATED APPLICATIONS

This application is a continuation-in-part of United States patent application Ser. No. 09/651,934 filed on Aug. 31, 2000, now U.S. Pat. No. 6,566,004 issued May 20, 2003 and a continuation-in-part of U.S. patent application Ser. No. 09/694,386 filed Oct. 23, 2000 now U.S. Pat. No. 6,663,994, issued Dec. 16, 2003.

FIELD OF THE INVENTION

This invention relates to a fuel cell system and more particularly to a system including a fuel cell having a foam gas distribution media with a variable porosity for delivering a gas to the reactive face of a membrane electrode assembly or a coolant through the fuel cell.

BACKGROUND OF THE INVENTION

Fuel cells have been used as a power source in many applications including a power source for an electrical vehicle to replace internal combustion engines. In proton exchange membrane (PEM) fuel cells, hydrogen is supplied to the anode of the fuel cell and oxygen is supplied as the oxidant to the cathode. A PEM fuel cell includes a membrane electrode assembly (MEA) having a thin, proton transmissive, non-electrically conductive solid polymer electrolyte membrane with the anode catalyst on one face and the cathode catalyst on the opposite face. The MEA is sandwiched between a pair of electrically conductive elements or bipolar plate assembly.

The fuel cell stack includes a plurality of cells stacked together in series while being separated one from the next by the bipolar plate assembly. Typically, the bipolar plate assembly includes a gas permeable, electrical conductive diffusion media and a gas impermeable, electrically conductive separator plate. The bipolar plate assembly serves several functions including (1) to distribute reactant gases across substantially the entire surface of the membrane; (2) to conduct electrical current between the anode of one cell and the cathode of the next adjacent cell in the stack; (3) to keep the reactant gases separated in order to prevent auto ignition; (4) to provide a support for the proton exchange membrane; (5) to accommodate the internal pressure loads associated with the reforming process and the external compression loads on the stack; and (6) to provide internal cooling passages to remove heat from the stack.

The separator plate includes an array of lands and grooves in the faces thereof which define a flow field for distributing the reactant gases (i.e., hydrogen and oxygen in the form of air) over the surfaces of the respective cathode and anode. The arrangement of the lands and the channels on both sides is such that the separator plate can withstand the compression loads. A piece of graphite paper or other diffusion media is placed over the flow field to prevent the MEA from collapsing down into the channel and blocking the flow of gas and to provide an electrical conduction path to the separator plate across the area of the membrane which overlays the channel.

Separator plates have been made from metal. However, the metal is relatively heavy and the corrosive environment requires that the metal plates be related with expensive coatings. Separator plates have also been fabricated from graphite which is lightweight compared to traditional metal plates, corrosion resistant and electrically conductive in the PEM fuel cell environment. However, graphite is quite brittle which makes it difficult to handle and has a relatively low electrical and thermal conductivity compared to metals. Graphite is also quite porous making it difficult and expensive to provide a thin gas impervious plate having the desired gravimetric and volumetric characteristics for a fuel cell stack.

The efficient operation of a fuel cell system depends on the ability of the fuel cell to generate a significant amount of electrical energy for a given size, weight, and cost of the fuel cell. Maximizing the electrical energy output of the fuel cell for a given size, weight, and cost is especially important in motor vehicle applications where size, weight, and cost of all vehicular components are especially critical to the efficient manufacture and operation of the vehicle. Therefore it is desirable, particularly for motor vehicle applications, to provide a fuel cell construction which will generate an increased amount of electrical energy for a given size, weight, and cost of the fuel cell.

SUMMARY OF THE INVENTION

The invention relates to a fuel cell having an improved bipolar plate assembly. The fuel cell includes a proton transmissive membrane having a catalytic anode layer on one face of the membrane and a catalytic cathode layer on the other face of the membrane. A bipolar plate assembly includes a gas distribution layer which is disposed on either side of the MEA and defines reactant gas flow fields extending over the catalytic members. The MEA is interdisposed between gas distribution layers to form a sandwich construction having first and second opposite edges.

According to the invention, the gas distribution layers include a conductive porous media divided into a plurality of generally parallel segments or legs that extend transversely through the media. Each leg defines a flow path extending across the face of the catalytic layer. This arrangement minimizes cross flow between the parallel segments so as to provide essentially uniform gas distribution across the face of the catalytic layers.

According to another feature of the invention, the porous media comprises an open cell foam media. The use of a foam media further contributes to the inexpensive lightweight aspects of the invention arrangement.

According to a further feature of the invention, the gas distribution layer is a sheet of porous media wherein the legs are defined by spatially varying the resistance to gaseous flow by the sheet. The variable flow resistance provides a simple and inexpensive means of providing the individual parallel legs of the porous media. In one embodiment of the invention, the resistance to flow is varied by spatially varying the porosity of the sheet. In another embodiment, the resistance to flow is varied by spatially varying the thickness of the sheet. In a further embodiment, the resistance to flow is spatially varied by spatially varying the thickness and the porosity of the sheet.

According to an additional feature of the invention, the porous media takes the form of a conductive graphite or metallic open cell foam media. The use of these relatively inexpensive conductive foam medias further contributes to the reduction in cost of the fuel cell while maintaining performance.

According to yet another feature of the invention, the gas distribution layer includes a separator plate and a porous media bonded to the separator plate. The porous media has a first portion forming at least one channel having an average pore size of less than or equal to 0.25 mm (0.010 inches) and a void fraction of equal to or greater than 85%. This arrangement of the gas distribution layer assures an essentially uniform distribution of gases through the channels in the porous media across the surface of the polymer electrolyte membrane. This arrangement can be inexpensive and easy to fabricate.

According to a further feature of the invention, a fuel cell stack having a plurality of stacked fuel cells includes a manifold positioned along the inlet and outlet edges of the porous sheets of each fuel cell. The manifold delivers reactant gases through each sheet of the fuel cell. This manifolding arrangement contributes to the efficient operation of the segmented gas distribution layers without adding significantly to the weight, cost, or size of the fuel cell arrangement.

According to an additional feature of the invention, the fuel cell stack further includes a coolant layer between adjacent cells and a manifold positioned along the inlet and outlet edges of each coolant layer. Coolant passages are provided within the layer to deliver a cooling fluid to the coolant layer.

Accordingly to another feature of the invention the MEA and gas distribution layers are configured with a complementary convoluted configuration to maximize the effective planar area of the reactant layers for a given surface area of the fuel cell stack.

According to further feature of the invention, the process of forming a gas distribution layer for a PEM fuel cell includes bonding a separator plate to a porous media. The porous media forms a portion defining at least one channel and a plurality of pores and having an average pore size of less than or equal to 0.25 mm (0.010 inches) and a void fraction of equal to or greater than 85%. This process of forming a gas diffusion layer assures an essentially uniform distribution of gases through the channel in the porous media across the surface of the MEA that is inexpensive and easy to fabricate.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

The invention may be further understood with reference to a generic fuel cell system. Therefore, before further describing the invention, a general overview of the system within which the improved fuel cell of the invention operates is provided. A more detailed description of the fuel cell system as it relates to the present invention, is set forth in U.S. application Ser. No. 09/541,934 filed on Aug. 31, 2000 which is assigned to General Motors Corporation and the disclosure of which is expressly incorporated by reference herein.

In the system, a hydrocarbon fuel is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content. The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

Figure 1:
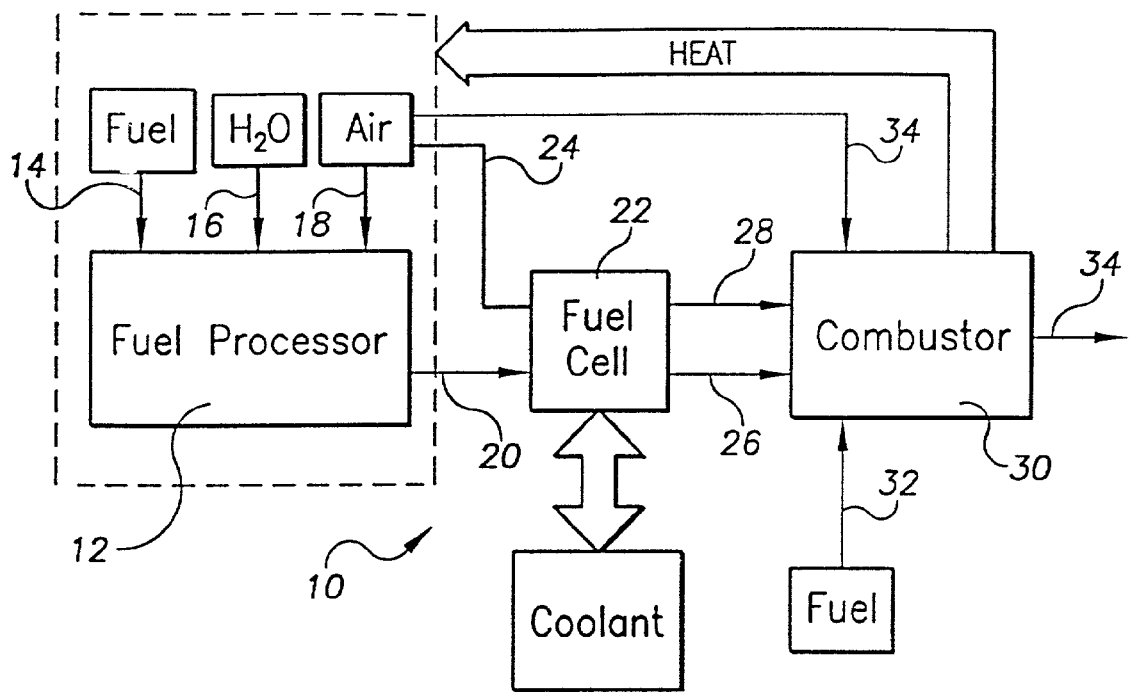
FIG. 1 is a schematic view of a fuel cell system incorporating a fuel cell according to the invention.
Figure 2:
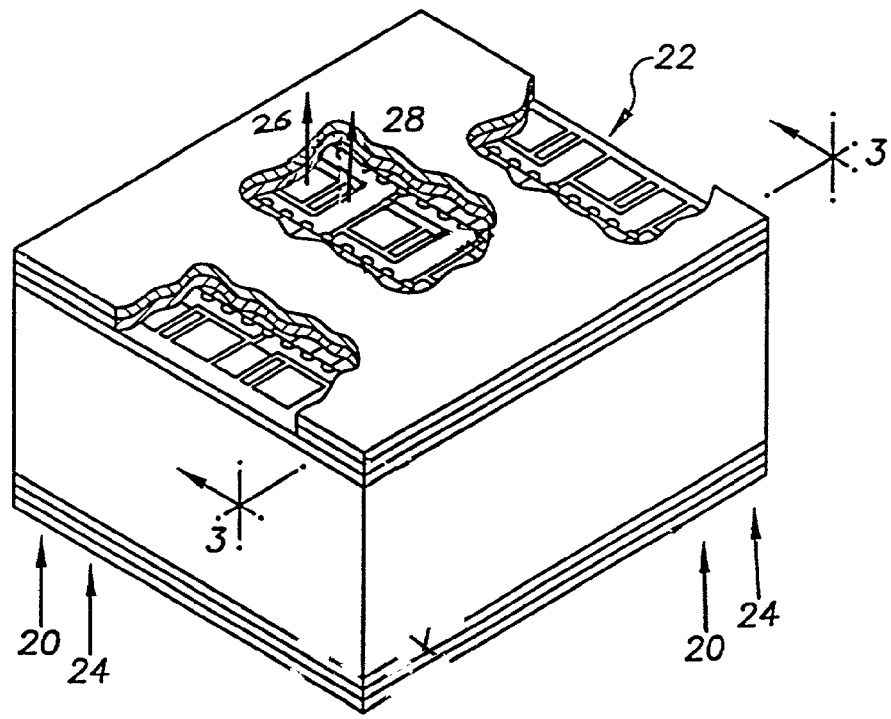
FIG. 2 is a schematic perspective view of a fuel cell stack according to the invention.

As shown in FIG. 1, a fuel cell system 10 includes a fuel processor 12 for catalytically reacting a reformable hydrocarbon fuel stream 14, and water in the form of steam from a water stream 16. In some fuel processors, air is also used in a combination preferential oxidation/steam reforming reaction. In this case, fuel processor 12 also receives an air stream 18. The fuel processor 12 contains one or more reactors wherein the reformable hydrocarbon fuel in stream 14 undergoes dissociation in the presence of steam in stream 16 and air in stream 18 to produce the hydrogen-rich reformate which is exhausted from the fuel processor 12 in reformate stream 20. The fuel processor 12 typically also includes one or more downstream reactors, such as water/gas shift (WGS) and/or preferential oxidizer (PrOx) reactors which are used to reduce the level of carbon monoxide in the reformate stream 20 to acceptable levels, for example, below 20 ppm. The $H_2$ rich reformate 20 is fed through the anode chamber of a fuel cell stack 22. At the same time, oxygen in the form of an air in stream 24 is fed into the cathode chamber of the fuel cell 22. The hydrogen from the reformate stream 20 and the oxygen from the oxidant stream 24 react in the fuel cell 22 to produce electricity.

Anode exhaust or effluent 26 from the anode side of the fuel cell 22 contains some unreacted hydrogen. Cathode exhaust or effluent 28 from the cathode side of the fuel cell 22 may contain some unreacted oxygen. These unreacted gases represent additional energy which can be recovered in a combustor 30, in the form of thermal energy, for various heat requirements within the system 10.

Specifically, a hydrocarbon fuel 32 and/or anode effluent 26 can be combusted, catalytically or thermally, in the combustor 30 with oxygen provided to the combustor 30 either from air in stream 34 or from the cathode effluent stream 28, depending on system operating conditions. The combustor 30 discharges an exhaust stream 34 to the environment and the heat generated thereby may be directed to the fuel processor 12 as needed.

With reference to FIG. 2-5, the present invention concerns the fuel cell 22 and particularly the construction of the fuel cell 22 to improve the gravimetric, volumetric and cost parameters thereof. Broadly considered, reformate 20 and air 24 are delivered to the fuel cell stack 22 in the manner previously described and hydrogen effluent 26 and oxygen-depleted air 28 are exhausted from the fuel cell 22.

Figure 3:
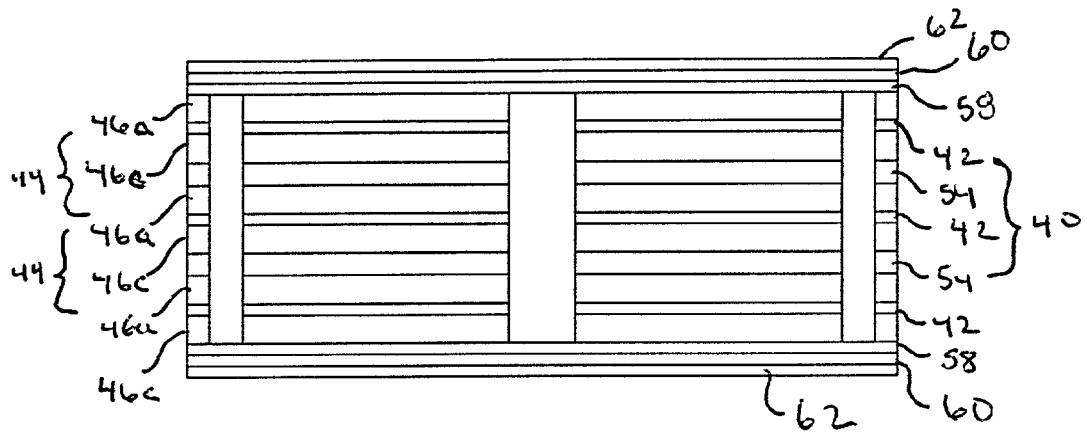
FIG. 3 is a cross-sectional view taken on line 3-3 of FIG. 2.

In overview, the fuel cell 22 includes multiple repeating units or cells 40 having an MEA 42, and a pair of bipolar plate assemblies 44 disposed on opposite sides of the MEA 42. Each bipolar plate assembly 44 consists of a coolant distribution layer 54 interdisposed between two gas distribution layers 46. The coolant distribution layer 54 is surrounded by a coolant manifold plate 56 which directs coolant to the coolant distribution layer 54. On each side of the coolant manifold plate 56 and coolant distribution layer 54 is an impermeable separator plate 48 which contains the coolant and separates the anode and cathode gas streams. Anode manifold plate 50 and cathode manifold plate 52 direct the reactant gases to the anode and cathode gas distribution layers 46, 46c respectively. A cell is formed when an MEA 42 is interdisposed between the anode gas distribution layer 46a of one cell and the cathode gas distribution layer 46c of the adjacent cell. Each end of the fuel cell stack 22 is provided with a collector plate 58, an insulator plate 60 and an end plate 62. In this manner, multiple repeating units 40 including coolant layers 54 are arranged in stacked relation as seen in FIG. 3. A skilled practitioner will recognize that the coolant layer may be omitted from a repeating unit if sufficient heat transfer is provided to maintain the cell within a desired operating range. Hence the term fuel cell stack is used to refer to the multi-cell unit.

Figure 5:
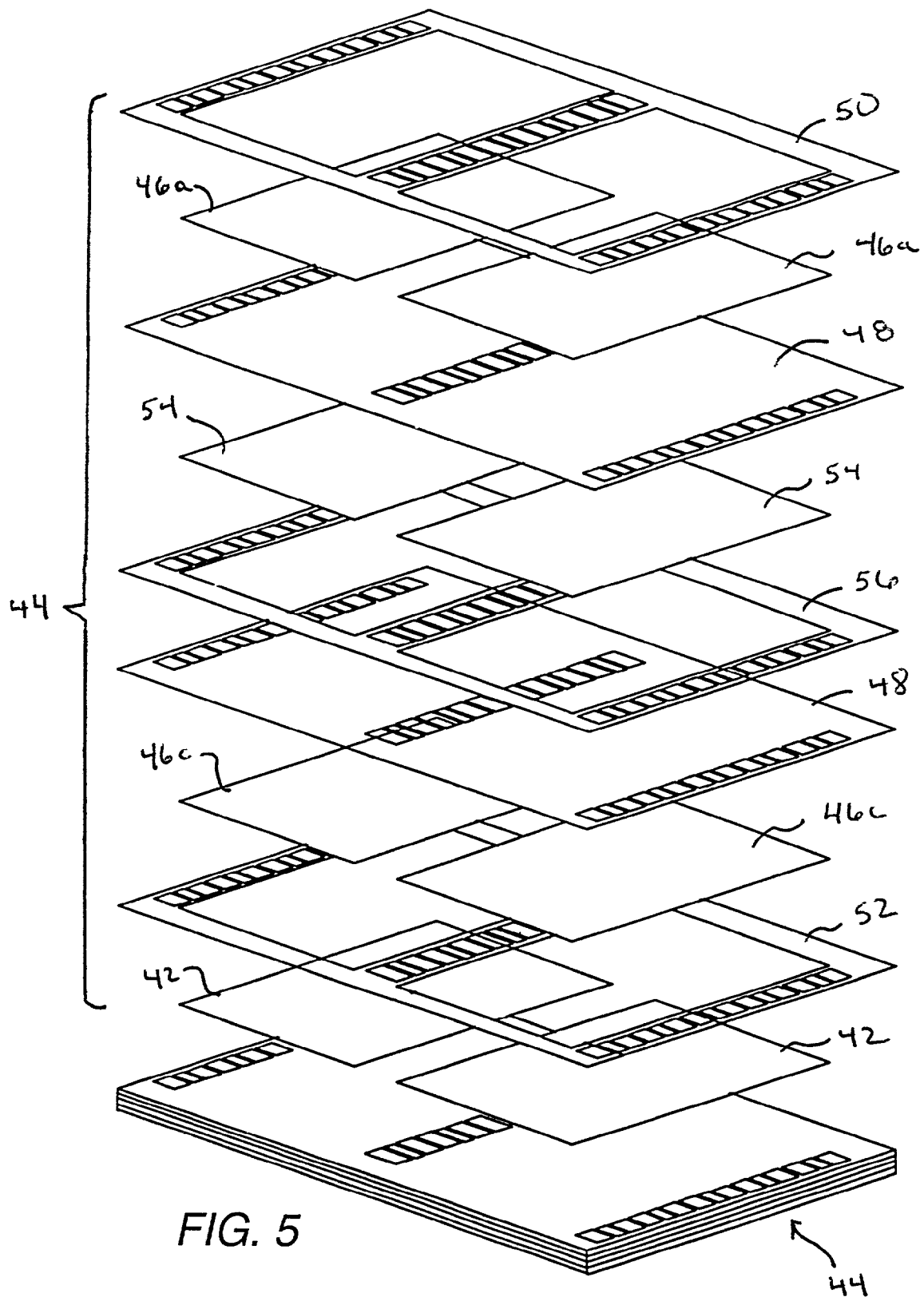
FIG. 5 is an exploded view of the fuel cell.

In the assembled relation of the various components of the stack, and as best seen in FIGS. 3 and 5, an anode distribution layer 46a is positioned within each anode manifold plate 50, a cathode distribution layer 46c is positioned within each cathode manifold plate 52 and a cooling distribution layer 54 is positioned within each cooling manifold plate 54. Separator plates 48 flank the cooling layer 54 to preclude mixing of the reactant gases and the cooling fluid while maintaining conductivity through the stack 22.

Figure 4:
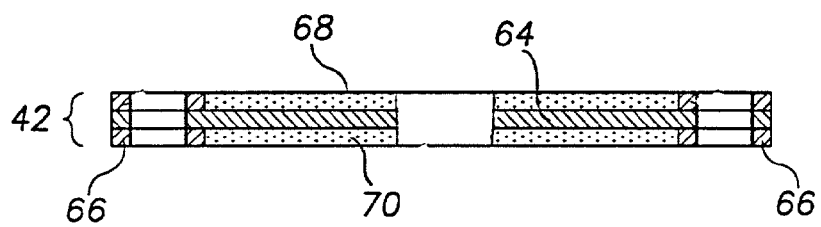
FIG. 4 is a cross-sectional view of an MEA utilized in the fuel cell.
Figure 8:
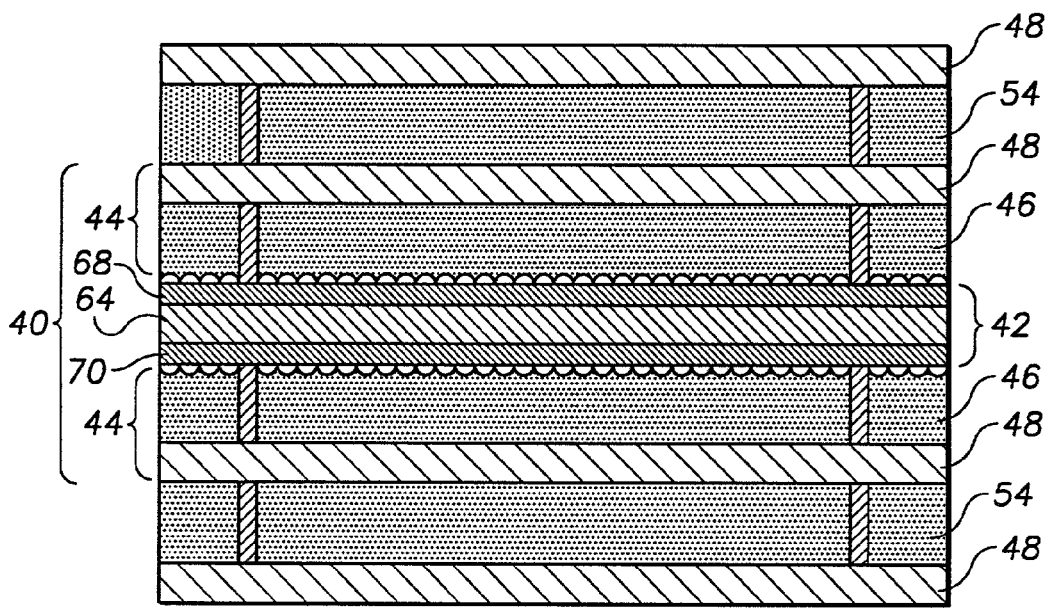
FIG. 8 is a partial cross-sectional view of a single repeating unit and a coolant distribution layer.

With reference now to FIG. 4-5 and 8, MEA 42 includes a membrane 64 in the form of a thin proton transmissive non-electrically conductive solid polymer electrolyte, a pair of seals or gasket frame members 66 positioned against the faces of the membrane 64. An anode catalyst layer 68 is formed on the upper face of the membrane 64 and a cathode catalyst layer 70 is formed on the lower face of the membrane 64. As best seen in FIG. 5, a plurality of inlet ports and exhaust ports are provided along the lateral margins of the bipolar plate assembly 44 to permit axial flow of the reactant gases and coolant through the stack 22 as hereinafter described.

With reference now to FIGS. 3 and 6-8, gas distribution layer 46 is formed of a conductive foam media. The preferred foam is an open cell foam having a continuous dispersion of pores and may comprise either a conductive graphite foam media or a conductive metallic foam media. The conductive graphite foam media may comprise, for example, graphitized pyrolytic graphite. The conductive metal foam media may comprise a high grade (i.e. high chromium/high nickel) stainless steel such as SS310 or SS904L, or a metal alloy with a low contact resistance, such as Inconel 601, or a titanium-based alloy, or a FeCrAlY alloy. A variety of suitable conductive foam materials are available from AstroMet of Cincinnati, Ohio or Porvair Advanced Materials of Hendersonville, N.C., or Ultramet of Pacoima, Calif.

The conductive foam media 46 is made from a material having a relatively high corrosion resistance to the reactants and coolant flowing through the fuel cell 22 and further having the material properties set forth below in Table 1.

TABLE 1

| Property | Desired Range | Preferred Range |
| --- | --- | --- |
| Gas Permeability | $\leq 10.0$ KPa/cm @ 5 m/s face velocity | $\leq 1.0$ KPa/cm @ 5 m/s face velocity |
| Compressive Yield Strength | $\geq 2.5$ MPa | $\geq 5.0$ MPa |
| Apparent Area Contact Resistivity | $\leq 50$ m$\Omega$-cm$^2$ | $\leq 5$ m$\Omega$-cm$^2$ |
| Bulk Resistivity | $\leq 5$ m$\Omega$-cm | $\leq 0.5$ m$\Omega$-cm |
| Material Density | $\leq 0.75$ g/cm$^3$ | $\leq 0.45$ g/cm$^3$ |

As used herein, the apparent area is defined as the aggregate contact area between the foam media 46 and the MEA 42. The bulk resistivity refers to the electrical resistivity of the individual ligaments which comprise the conductive foam media 46.

In order to improve volumetric power density in the stack 22, the spacing between repeating units 40 is minimized. Presently, a cell repeat distance of 1.0 mm is preferred for an uncooled cell requiring the thickness of the porous media 46 to be approximately 0.475 mm. In addition, the porous media 46 must have at least two pores through the thickness thereof to maintain sufficient structural integrity. Thus, a porous media having an average pore size of $\leq 0.25$ mm and a void fraction of $\geq 85\%$ is desirable, and a foam media having an average pore size of $\leq 0.125$ mm and a void fraction of $\geq 90\%$ is preferred. As used herein the term void fraction refers to the ratio of void volume or air space to the total volume of the gas distribution layer.

Since the MEA 42 is supported on the ligaments (i.e. material adjacent the pores in the foam media), the distance between the ligaments proportionally decreases as the pore size decreases, resulting in lower stress concentrations on the MEA 42. Thus, the preferred foam media has a high pore density in all three directions such that an interface layer between the foam and the MEA is not needed.

As previously indicated a further consideration in the selection of a suitable foam media is the low contact resistance thereof. A stand alone foam media which has a sufficiently low contact resistance and high corrosion resistance is the most economical solution. However, a porous interface layer may optionally be interdisposed between the MEA and the foam media. The interfaces layer is preferably between 25 and 50 micrometers in thickness and serves to reduce contact resistance to within the desirable or preferred ranges set forth in Table 1, to distribute compression loads on the MEA and/or to add flexibility in controlling the pressure drop through the cell.

As previously indicated, a further consideration in the selection of suitable of the foam media is the conductivity of the foam material or in other words the bulk conductivity. In this regard, a conductive filament or fiber may be incorporated into the foam media to increase the bulk conductivity and (decrease the bulk resistivity). Preferably, the filaments are long strands of an electrically-conductive material such as high nickel content alloy or carbon and having an average thickness of less than 25 micrometers.

Figure 9:
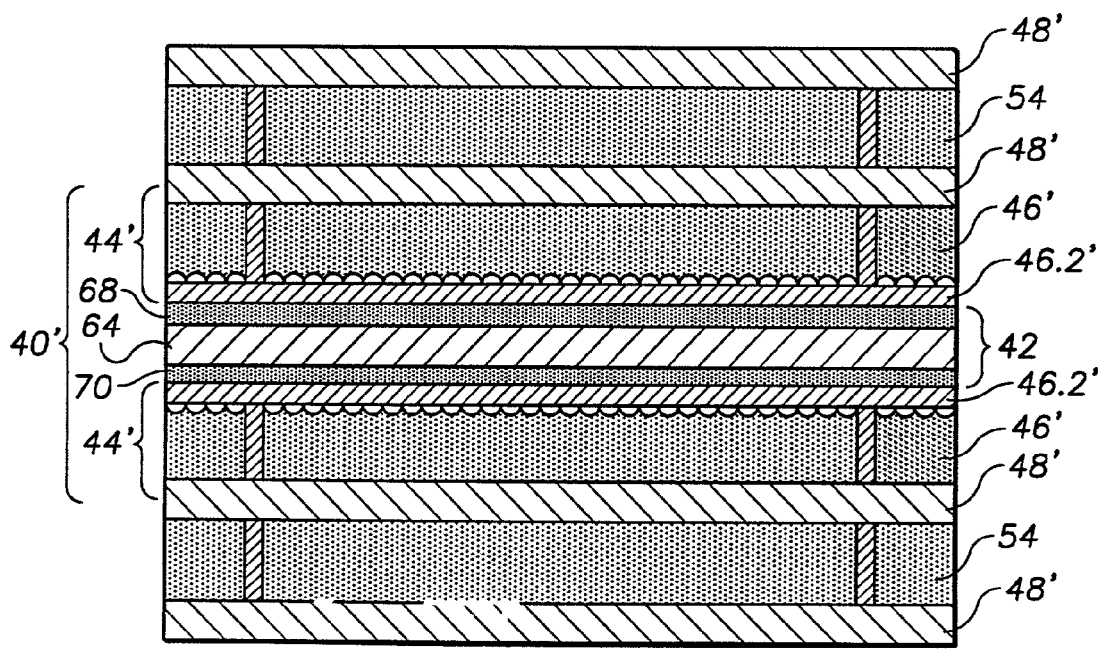
FIG. 9 is a partial cross-sectional view of a single repeating unit and a coolant distribution layer having an interface layer between the MEA and the gas distribution layer.

With reference now to FIG. 9, repeating cell 40' includes an MEA 42 and a pair of bipolar plate assemblies 44' disposed on opposite sides of the MEA 42. Each bipolar plate assembly 44' includes a gas distribution layer 46' having an interface layer 46.2' formed on or bonded to the surface confronting the MEA 42 and a separator plate or shim 48' bonded to the surface of the gas distribution layer 44' opposite the interface layer 46.2'. The interface layer 46.2' may take the form of an etched foil or fine mesh screen of a low contact resistance material overlaying the foam media and bonded by sintering, brazing, diffusion bonding or other suitable process which does not significantly increase the resistance at the bond interface. Presently, a noble metal layer such as a coating of gold, a high alloy stainless steel, or nickel alloy such as Inconel 601, or a porous metal material such as GPM available from Porvair Advanced Materials of Hendersonville, N.C. are preferred. The porous metal material may have an advantage over the other preferred materials in that the interface layer 46.2' may be bonded to the foam media during the sintering stage of the porous metal material. Alternately, the foam media and the porous metal material may be sintered simultaneously, thereby forming a gas distribution layer 46' having a unified interface layer 46.2'.

With reference again to FIGS. 5-8, gas distribution layer or sheet 46 is divided into a plurality of segments or legs 72 extending transversely from a first edge 74 to a second edge 76 to define generally parallel porous reactant paths or channels. Legs 72 are defined by spatially varying the resistance to gaseous cross-flow (i.e. flows generally perpendicular to legs 72) within the sheet 46. The resistance to cross-flow may be spatially varied by spatially varying the porosity within the sheet, spatially varying the thickness within the sheet, or spatially varying both the thickness and the porosity within the sheet.

Cooling layer 54 is substantially similar to the gas distribution layers 46. Coolant layer 54 includes a plurality of legs each extending from a first edge to a second edge. The legs define a plurality of generally parallel porous coolant paths extending transversely through the fuel cell stack. A skilled practitioner will readily recognize that the discussion of the gas distribution layer 44 set forth herein is equally applicable to coolant layer 54 due to the similarities therebetween.

Figure 6:
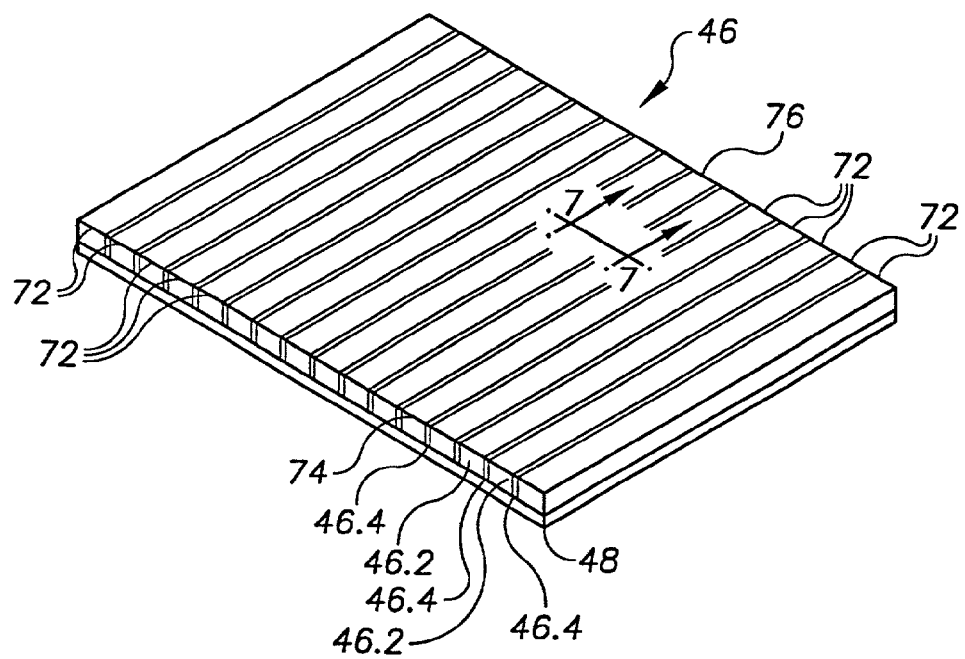
FIG. 6 is a perspective view of a first preferred form of the gas distribution layer utilized in the fuel cell.
Figure 7:
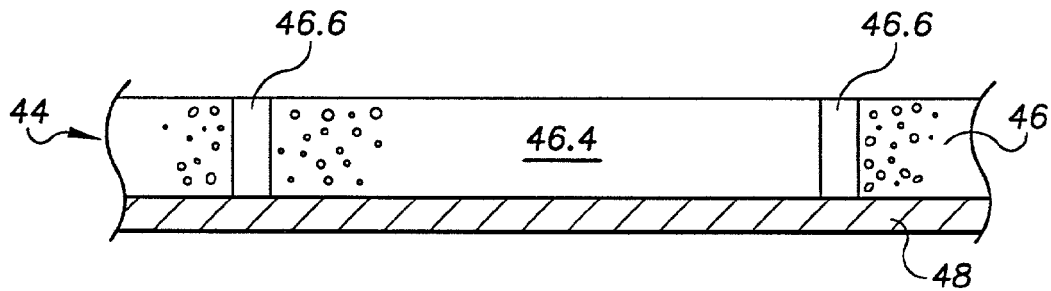
FIG. 7 is a cross-sectional view taken on line 7-7 of FIG. 6.

In a first preferred construction of the bipolar plate assembly 44, gas distribution layer 46 seen in FIGS. 6 and 7, legs 72 are formed by spatially varying the porosity of the sheet. The conductive gas distribution layer 46 includes alternating rows of a relatively wide strips 46.4 of a high porosity foam material with narrow strips 46.6 of a relatively low porosity foam material. The low porosity foam material 46.6 forms a barrier on both sides of the high porosity foam material 46.4 to channelize the flow of reactant gases across the face of the MEA 42. Thus, a generally parallel reactant gas flow path is formed. The low porosity foam media may be formed of a similar material but having an average pore diameter of less than or equal to 0.1 mm (0.004 inches and preferably less than or equal to 0.05 mm (0.002 inches). Stated another way, the high porosity conductive foam media have a permeability that is at least 250% greater than the low porosity conductive foam media.

The present invention contemplates various methods of fabricating the gas distribution layers. In a first preferred method of fabrication, the gas distribution layers 46 may be formulated by building up a block of alternate high porosity and low porosity foam layers and then separating sections of the block as represented by dash lines to form the individual sheets of the distribution layer. Several methods of separation are available including sawing, grinding, electrical discharge machining (EDM), layer cutting and waterjet cutting. In a second preferred method of fabrication, the segmented distribution layer may be constituted by a plurality of individual foam strips or segments arranged in side-by-side relation with appropriate delineations between the separate strips. The segments are then bonded together to form the gas distribution layer. In a third preferred method of fabrication, a precursor foam blank is cut to size (accounting for shrinkage during the sintering process), then coated and sintered at an elevated temperature, and optionally an elevated pressure. The coating process could employ a CVD process or alternatively a slurry process in which the foam blank is pressed to shape during drying.

Figure 10:
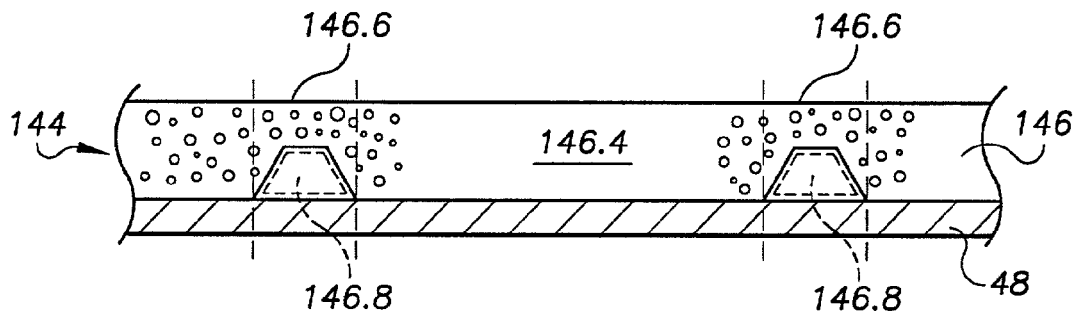
FIG. 10 is a cross-sectional view of a second preferred form of the gas distribution layer.

In a second preferred construction of the bipolar plate assembly 144, gas distribution layer 146, as seen in FIG. 10, legs are formed by spatially varying the thickness of the respective sheet. The sheet includes alternating thick sections 146.4 and thin sections 146.6 to form the distribution layer. The thin section 146.6 of foam material forms a barrier on both sides of the thick section 146.4 of foam material to channelize the flow of reactant gases across the face of the MEA 42. An epoxy strip or bead 146.8 may be disposed in the grooves defined between the thick section 146.4 and the thin section 146.6. Thus, a generally parallel reactant gas flow path is formed.

Figure 11:
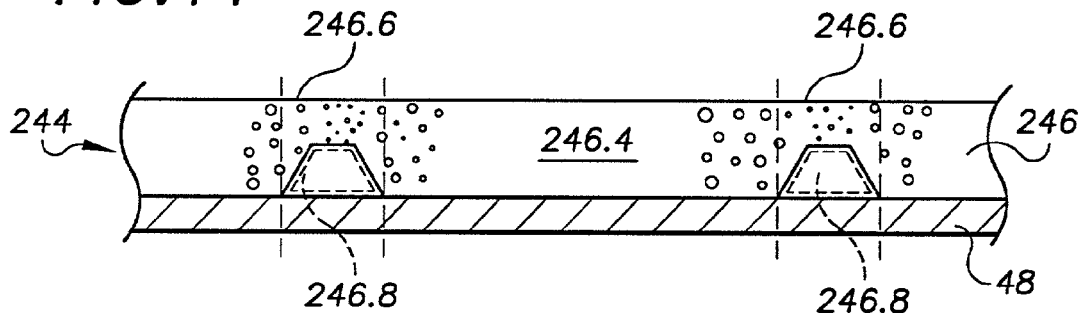
FIG. 11 is a cross-sectional view of a third preferred form of the gas distribution layer.

In a third preferred construction of the bipolar plate assembly 244 gas distribution layer 246, as seen in FIG. 11, the legs are formed by compressing spaced strips along the sheet to form alternating thick, high porosity uncompressed sections 246.4 and thin, compressed low porosity sections 246.6 in the distribution layer. The thin, low porosity foam material 246.6 forms a barrier on both sides of the thick, high porosity foam material 246.4 to channelize the flow of reactant gases across the face of the MEA 42. Epoxy strips or beads 246.8 may be disposed in the grooves defined between the thick 246.4 and thin 246.6 sections of the layer. Thus, a generally parallel reactant gas flow path is formed.

Figure 12:
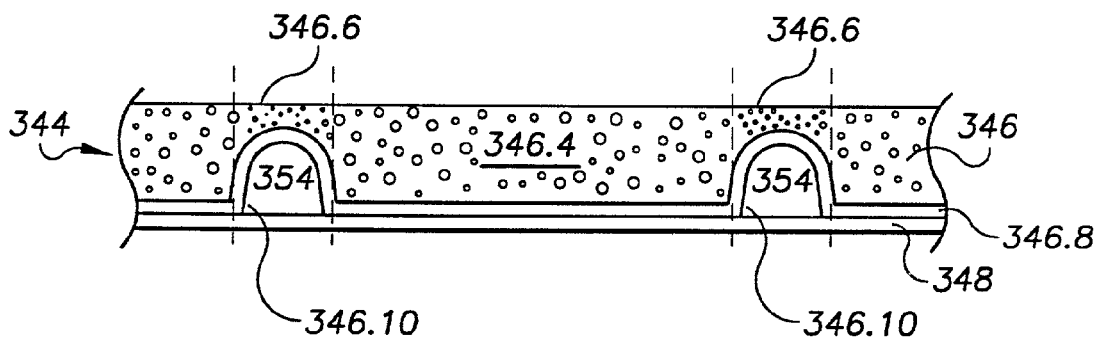
FIG. 12 is a cross-sectional view of a fourth preferred form of gas distribution layer with built-in cooling.

With reference now to FIG. 12, a fourth preferred constriction of the bipolar plate assembly 344 is shown. The foam layer 346 is selectively compressed at spaced intervals to provide high density and low porosity regions 346.6 separating high porosity regions 346.4. A plate 346.8 of conductive material is positioned over the foam 346 with individual spaced convolutions 346.10 of the plate respectively overlying the compressed low porosity regions 346.6. Separator plate 348 is positioned over plate 346.8 to define transversely extending coolant passages 354 overlying the compressed regions 346.6 of the foam layer 346. This arrangement has the advantage of providing coolant passages 354 at the same level as the gas distribution layer, thereby reducing the overall thickness of the stack.

Figure 13:
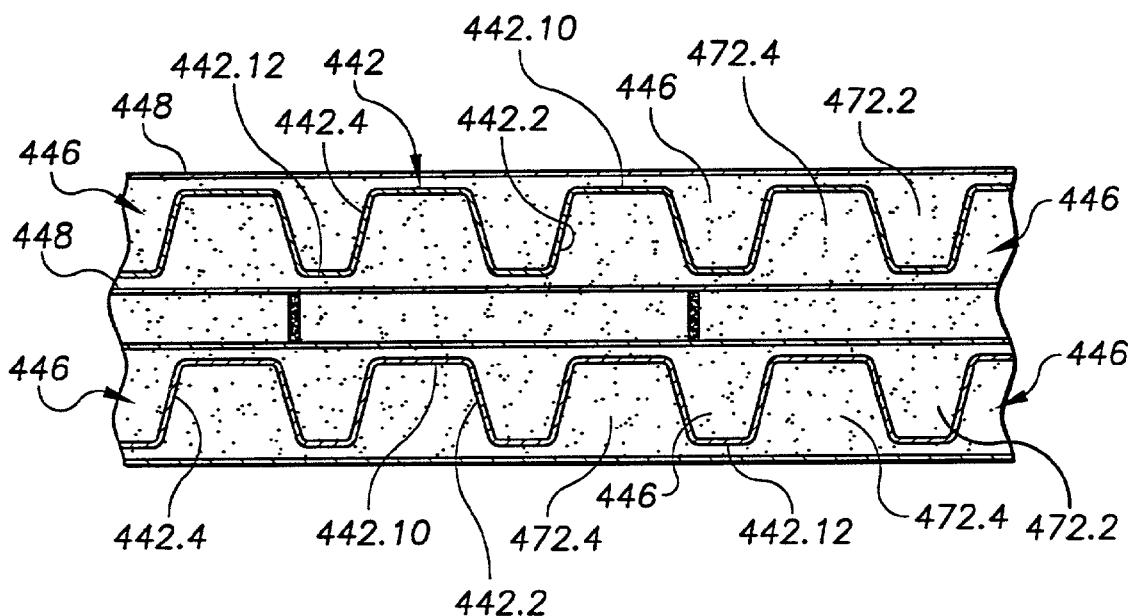
FIG. 13 is a cross-sectional view of a fifth preferred form of the fuel cell.

In a fifth preferred construction of the present invention, as seen in FIG. 13, in cross section MEA 442 has a convoluted configuration. Specifically, has an uneven or asymmetrical trapezoidal configuration including relatively narrow convolutions 442.2 alternating with relatively wide convolutions 442.4. An important aspect of the convoluted configuration of the MEA is to maximize the ratio of membrane surface area to effective planar area of the fuel cell thereby increasing the electrical output of the fuel cell for a given fuel cell surface area.

In cross section, gas distribution layers 446 have a trapezoidal configuration conforming to the trapezoidal configuration of MEA 442 which are complementary to MEA 442 so as to nest or fit together in a jigsaw puzzle fashion. Specifically, upper gas distribution layer 446 has a trapezoidal lower surface 446.2 corresponding to the trapezoidal configuration of MEA 442 and a generally planar upper surface 446.4, and lower gas distribution layer 446 has a trapezoidal upper surface 446.6 corresponding to the trapezoidal configuration of MEA 442 and a generally planar lower surface 446.8. Separator plates 448 has a planar configuration and is preferably formed of a conductive metallic material such as stainless steel or titanium.

In the assembled relation of the fuel cell 22, the lower trapezoidal face 446.2 of upper gas distribution layer 446 is positioned against the upper trapezoidal face of MEA 442.6, the upper trapezoidal face 446.6 of lower gas distribution layer 446 is positioned against the lower trapezoidal face of MEA 442.8, the planar upper face 446.4 of upper gas distribution layer 446 is positioned against the planar under face of upper separator 448, and the planar lower face 446.8 of lower gas distribution layer 446 is positioned against the planar upper face of lower gas separator 448. Separator plates 448 are bonded to the adjacent face of gas distribution 446 layer in a sintering, brazing, or conductive adhesive process.

It will be seen in FIG. 13 that the peaks 442.10 of the MEA 442 are positioned proximate the upper gas separator plate 448 to define a series of spaced parallel channels or legs 472.2 extending transversely through gas distribution stack and the valleys 442.12 of the MEA are positioned proximate the lower gas separator plate 448 to define a series of parallel spaced channels 472.4 extending transversely through gas distribution layer 446. By virtue of the uneven or asymmetrical nature of the trapezoidal configuration of the MEA, the parallel spaced channels 472.4 are wider than the parallel spaced channels 472.2 whereby to provide a greater gas flow capacity. As presently preferred, the asymmetrical configuration of the MEA allows greater quantities of air to be delivered to the cathode of the MEA than the quantities of $H_2$ or reformate delivered to the anode of the MEA, in compensation for the fact that the air is only 21% $O_2$.

The fuel cell structure seen in FIG. 13 will be seen to comprise a portion of two stacked fuel cells 440 separated by a cooling layer 454 positioned between the gas separator plates 448 of the fuel cells. Cooling layer 454 may comprise an open cell foam structure similar to the type employed for coolant distribution layer 54 and may be divided into parallel segments extending transversely through the coolant distribution layer 454 by relatively dense foam members 454.2 positioned at spaced points along the cooling layer.

In use, hydrogen-rich reformate 20 is routed by suitable manifolding, as herein after described, through the small channels 472.2 for reaction with the anode electrode of the MEA 442 while air is simultaneously passed via suitable manifolding through the relatively large channels 472.4 for reaction with the cathode electrode of the MEA 442. As the hydrogen-rich reformate moves through channels 442.2, it is confined by the convoluted configuration of the MEA 442 so that little or no cross migration occurs between the parallel channels. An essentially uniform distribution of hydrogen across the surface of the anode electrode is ensured irrespective of unavoidable and significant variations in the porosity of the foam material of the foam media, whereby to maximize the generation of electrical energy occurring by virtue of the interaction between the hydrogen and the anode electrode. The gas flow distribution over the anode electrode is essentially uniform since the resistance to flow is the total restriction along each channel and thus variations in porosity are averaged over the length of a channel rather than allowing a local perturbation to affect the entire flow field.

Similarly, the air moving through the wide channels 472.4 is confined by the convoluted configuration of the MEA 442 to the respective channels so that little or no cross migration occurs between the parallel channels. An essentially uniform distribution of oxygen across the surface of the cathode electrode is ensured irrespective of unavoidable and significant variations in the porosity of the foam material of the foam media, whereby to maximize the generation of electrical energy occurring by virtue of the interaction between the oxygen and the cathode electrode.

Figure 14:
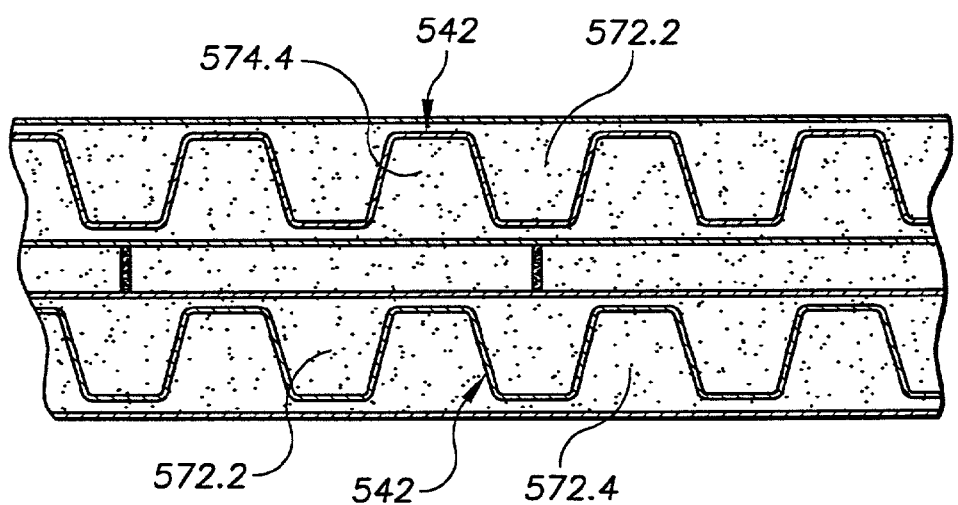
FIG. 14 is a cross-sectional view of a first alternative form of the fifth preferred embodiment illustrated in FIG. 13.

A first alternate fuel cell construction of the fifth preferred embodiment seen in FIG. 14 corresponds generally to the construction seen in FIG. 13 with the exception that the MEA 542 has an even or uniform trapezoidal configuration so that the channels 572.2 and 572.4 defined by the MEA 542 are essentially equal in volume so that essentially uniform volumes of reformate and air are delivered to the anode and cathode electrodes respectively.

Figure 15:
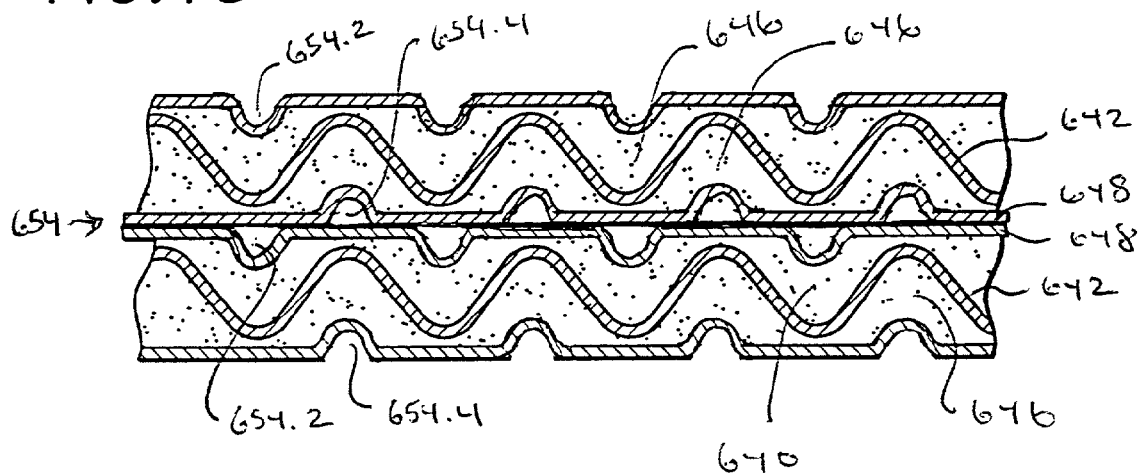
FIG. 15 is a cross-sectional view of a second alternate form of the fifth preferred embodiment illustrated in FIG. 13.

A second alternate fuel cell construction of the fifth preferred embodiment seen in FIG. 15 is generally similar to the construction of FIG. 13 with the exception that the MEA 642 has a uniform sinusoidal configuration and gas distribution layer 646 have a complimentary shape which again produces similar size channels for the transport of the air and the reformate across the fuel cell. Also the coolant distribution layer 654 is defined by a plurality of channels 654.2 and 654.4 formed in the gas separator plates 648. In this manner channels 654.2 and 654.4 function in the same manner as the parallel segments illustrated in FIG. 13 to distribute a cooling fluid through the individual cells of the fuel cell stack.

Figure 16:
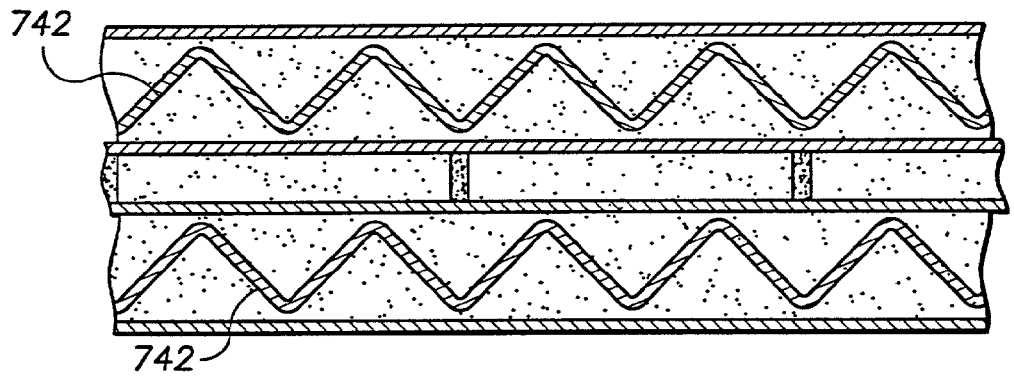
FIG. 16 is a cross-sectional view of a third alternate form of the fifth preferred embodiment illustrated in FIG. 13.

A third alternate fuel cell construction of the fifth preferred embodiment seen in FIG. 16 is generally similar to the construction of FIG. 13 with the exception that the MEA 742 has a uniform triangular configuration so as to again provide passages for the flow of the reformate and the air across the fuel cell of essentially equal size.

Figure 17:
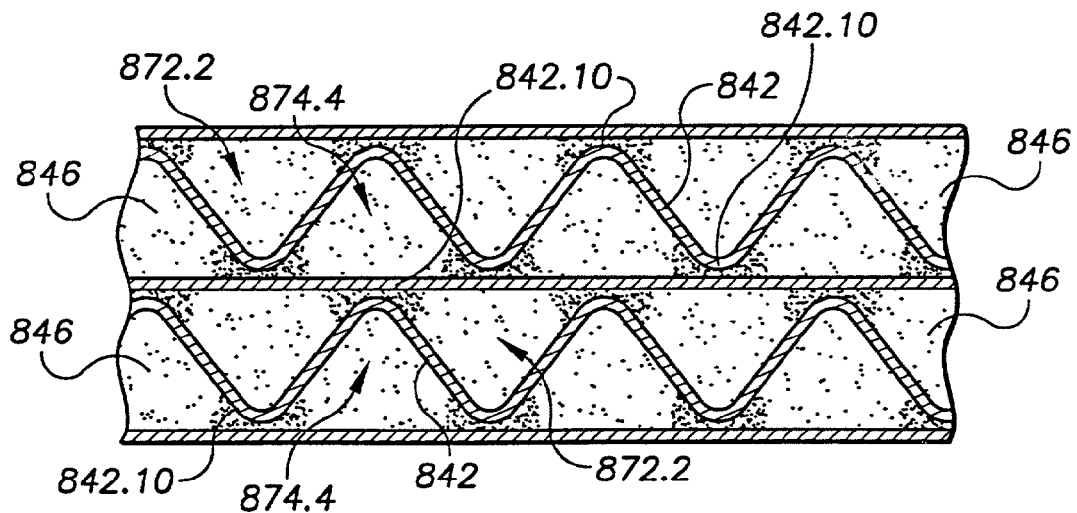
FIG. 17 is a cross-sectional view of a fourth alternate form of the fifth preferred embodiment illustrated in FIG. 13.

A fourth alternate fuel cell construction of the fifth preferred embodiment seen in FIG. 17 is generally similar to the construction seen in FIG. 8 with the exception that the foam gas distribution layers 846 are formed so that the density of the gas distribution layer 846 varies from a maximum density (minimum porosity) proximate the peaks 842.10 of the MEA 842 to a minimum density (maximum porosity) opposite the peaks 842.10. As a result, maximum density areas further enhance the separation between the successive parallel hydrogen reformate channels 872.2 and between the successive parallel oxygen channels 872.4 whereby to further minimize cross migration between the parallel channels and ensure essentially uniform distribution of reformate and oxygen across the surfaces of the respective electrodes.

It will be understood that inlet and exhaust ports are formed in the manifold plates 50, 52, 56, in the MEA 42 and in the separator plate 48 and correspond in size, shape, spacing and alignment to define a plurality of passageways extending axially through the fuel cell stack 22. Further details of the manifolds and porting can be found in U.S. application Ser. No. 09/541,934 which has been expressly incorporated by reference herein. It will be further understood that the sizes of these ports vary in accordance with the flow rate and pressure requirements of the various fluids being communicated therethrough. For example, the cathode ports which communicate cathode air, are relatively wide; the cooling ports which communicate a cooling liquid, are relatively narrow; and the anode ports which communicate anode hydrogen, are more narrow than the cathode ports but wider than the coolant ports.

Collector plates 58 which are of a conventional configuration and construction collect cumulative electrical energy generated by the cells 40 in the fuel cell stack 22 for distribution to a suitable load such as a vehicular motor. Insulator plates 60 which are also of a conventional configuration and construction electrically isolate the end plates 62 from the collector plates 58.

End plates 92 which are of a conventional configured construction impart a compressive load for maintaining a proper interface between all of the layers of the stack, to ensure proper distribution of fluids within the stack and proper electrical conductivity within the stack. If the end plates 92 are not conductive, the insulator plates 60 may be eliminated.

In operation, hydrogen is passed axially through the anode inlet ports and is diverted at each anode manifold inlet portion 80 for passage through the transverse passages and the sub-passages to legs 72 thereafter to the anode manifold outlet portion 82 where the hydrogen affluent passes through the transverse sub-passages and passages to the anode exhaust port. As the hydrogen moves from the inlet ends 74 to the outlet ends 76 of the legs 72, the hydrogen is confined by the low porosity strips 46.6 essentially to the respective segments 46.4 so that little or no cross flow occurs between the parallel segments, whereby to ensure an essentially uniform distribution of hydrogen across the surface of the underlying anode face irrespective of unavoidable and significant variations in the porosity of the foam material of the foam media. The uniform distribution of hydrogen maximizes the generation of electrical energy occurring by virtue of the interaction between the hydrogen and the anode electrode.

Simultaneously, cathode air is passed axially through the cathode inlet port and diverted at each cathode manifold layer whereby the air moves through the transverse passages and sub-passages are legs and subsequent discharge through the cathode exhaust ports. Again, the low porosity strips 46.6 between the high porosity strips 46.4 serve to preclude cross migration of air between the adjacent strips and thereby ensure that a uniform supply of air and oxygen is distributed to all areas of the overlying cathode electrode. The gas flow distribution over the catalyst layers is essentially uniform since the resistance to flow is the total restriction along each segment and thus variations in porosity are averaged over the length of a segment rather than allowing a local perturbation to effect the entire flow field. In addition, the narrow width of the strips 46.6 as compared to the segment 46.4 ensure that virtually all of the area of the respective MEA electrode will be exposed to the respective reactant gas with the result that electrical energy generation is maximized. And since reactant gas will diffuse into the narrow divider strips 46.6 because they are porous, even the small electrode areas beneath the strips will generate electrical energy, whereby to further maximize the generation of electrical energy in the cell.

Simultaneously, cooling fluid is passed axially through the coolant inlet port and is diverted at each coolant manifold layer whereby the coolant flows through the passages and sub-passages and then through the individual legs to coolant exhaust manifold and out the coolant exhaust port. Again, the low porosity strips 46.6 between the high porosity strips 46.4 ensure a uniform distribution of the cooling fluid over the adjacent surfaces of the overlying and underlying separator plate whereby to ensure uniform cooling of the total area of the adjacent cells.

The invention will be seen to provide a fuel cell which is lighter, smaller, and less expensive than the comparable prior art fuel cells without any sacrifice in the electrical energy outputted by the fuel cell. Specifically, the substitution of a foam gas distribution layer, in place of the prior art metallic bipolar plate with its serpentine lands and channels, reduces both the weight and volume of the fuel cell. The ability of the foam gas distribution layer to distribute gas over essentially the entire area of the membrane, as opposed to only the area exposed to the grooves of the serpentine channels of the prior art bipolar plates, further allows the elimination of the prior art graphite paper or cloth between the bipolar plate and the membrane since the gas distribution and membrane support functions of this cloth are now satisfied by the foam layer. The elimination of this graphite paper or cloth further reduces the volume, weight and cost of the fuel cell.

The bonding of the foam to the adjacent separator along one face of the foam layer in combination with the multi-point and total electrical contact between the other face of the foam layer and the MEA reduces the contact resistance across the cell. Accordingly, the compressive loading required to maintain electrical conductivity through the cell is reduced such that the size and strength of the end plates may be minimized with consequent savings in volume, weight, and cost. In this regard, lower compressive loading requirements allows the use of lighter and less expensive materials for the end plates such, for example, as a suitable plastic. In the end result of the invention technology is a fuel cell stack which is significantly smaller, lighter, and less expensive than prior art fuel cells without reducing the electrical energy output level per unit area of fuel cell.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims.

What is claimed is:

1. A fuel cell comprising:
   a membrane electrode assembly having a membrane, a first catalytic layer on a first face of said membrane and a second catalytic layer on a second face of said membrane;
   a first bipolar plate assembly adjacent said first catalytic layer and in electrical contact therewith, said first bipolar plate assembly including:
   a first gas distribution layer having a plurality of porous, reactant gas flow channels extending transversely through said first gas distribution layer in a generally parallel orientation, a first face of said first gas distribution layer confronting said first catalytic layer such that said plurality of porous, reactant gas flow channels are in fluid communication with said first catalytic layer; and
   a first non-porous impermeable, conductive separator plate secured to a second face of said first gas distribution layer;
   a second bipolar plate assembly adjacent said second catalytic layer and in electrical contact therewith, said second bipolar plate assembly including:
   a second gas distribution layer having a plurality of porous, reactant gas flow channels extending transversely through said second gas distribution layer in a generally parallel orientation, a first face of said second gas distribution layer confronting said second catalytic layer such that said plurality of porous, reactant gas flow channels are in fluid communication with said second catalytic layer; and
   a second non-porous impermeable, conductive separator plate secured to a second face of said second gas distribution layer.

2. The fuel cell of claim 1 wherein each of said plurality of porous, reactant gas flow channels has a porous media having an average pore size no greater than 0.25 mm and a void fraction of no less than 85%.

3. The fuel cell of claim 1 wherein each of said plurality of porous, reactant gas flow channels comprises a transverse section of said gas distribution layer having a medial portion and a pair of lateral edge portions bordering said medial portion, said medial portion has a permeability that is at least 200% greater than a permeability of said pair of lateral edge portions.

4. The fuel cell of claim 3 wherein said medial portion has a porous media having an average pore size no greater than 0.25 mm and a void fraction of no less than 85%.

5. The fuel cell of claim 1 wherein said membrane electrode assembly has a convoluted configuration, and wherein said first face of said first gas distribution layer has a convoluted surface juxtaposed to said first catalytic surface and wherein said first face of said second gas distribution layer has a convoluted surface juxtaposed to said second catalytic surface.

6. The fuel cell of claim 1 wherein each of said plurality of porous, reactant gas flow channels has a gas permeability no greater than 10 kPa/cm at 5 m/s face velocity.

7. The fuel cell of claim 1 wherein each of said plurality of porous, reactant gas flow channels has a contact electrical resistivity of no greater than 50 m$\Omega$-cm$^2$.

8. The fuel cell of claim 7 further comprising a porous, conductive interface layer interdisposed between said at least one of said first and second gas distribution layers and at least one of said first and second catalytic layers.

9. The fuel cell of claim 8 wherein said interface layer is selected from a group consisting of an etched foil, a fine mesh screen and GPM.

10. The fuel cell of claim 1 wherein said first and second gas distribution layers are formed of a metallic foam media.

11. The fuel cell of claim 10 wherein said metallic foam media is selected from a group consisting of a high alloy stainless steel, a high alloy nickel, a titanium-based alloy, and FeCrAlY.

12. The fuel cell of claim 1 wherein said first and second gas distribution layers are formed of a graphite-based foam media.

13. The fuel cell of claim 12 wherein said graphite-based foam media is graphitized pyrolytic graphite.

14. The fuel cell of claim 1 further comprising a coolant distribution layer adjacent to said first bipolar plate assembly and in thermal contact therewith.

15. The fuel cell of claim 14 wherein said coolant distribution layer comprises a plurality of porous coolant flow channels extending transversely through said coolant distribution layer in a generally parallel orientation.

16. The fuel cell of claim 15 wherein each of said wherein each of said plurality of porous coolant flow channels comprises:
  a leg portion having a first width and a first porosity extending transversely through said coolant distribution layer; and
  a barrier portion disposed on each side of said leg portion, said barrier portions having a second width which is less than said first width and a second porosity which is substantially less than said first porosity to channelize the flow of coolant through each of said plurality of porous coolant flow channels.

17. The fuel cell of claim 1 wherein each of said wherein each of said plurality of porous, reactant gas flow channels comprises:
  a leg portion having a first width and a first porosity extending transversely through said gas distribution layer; and
  a barrier portion disposed on each side of said leg portion, said barrier portions having a second width which is less than said first width and a second porosity which is substantially less than said first porosity to channelize the flow of reactant gases through each of said plurality of porous, reactant gas flow channels.

18. The fuel cell of claim 17 wherein said leg portion has a permeability that is at least 200% greater than a permeability of said barrier portions.

19. The fuel cell of claim 17 wherein each of said barrier portions define a groove having a low porosity bead disposed therein.

20. A fuel cell comprising:
  a membrane electrode assembly having a membrane, a first catalytic layer on a first face of said membrane and a second catalytic layer on a second face of said membrane;
  a first bipolar plate assembly adjacent said first catalytic layer and in electrical contact therewith, said first bipolar plate assembly including:
  a first gas distribution layer having a first plurality of porous, reactant gas flow channels extending transversely through said first gas distribution layer in a generally parallel orientation, a first face of said first gas distribution layer confronting said first catalytic layer such that said first plurality of porous, reactant gas flow channels are in fluid communication with said first catalytic layer, each of said first plurality of porous gas flow channels including a leg portion having a first porosity extending transversely through said gas distribution layer and a barrier portion disposed on each side of said leg portion, said barrier portion having a second porosity which is substantially less than said first porosity to channelize the flow of reactant gases through each of said plurality of porous reactant gas flow channels; and
  a first non-porous, conductive separator plate secured to a second face of said first gas distribution layer;
  a second bipolar plate assembly adjacent said second catalytic layer and in electrical contact therewith, said second bipolar plate assembly including:
  a second gas distribution layer having a second plurality of porous, reactant gas flow channels extending transversely through said second gas distribution layer in a generally parallel orientation, a first face of said second gas distribution layer confronting said second catalytic layer such that said second plurality of porous, reactant gas flow channels are in fluid communication with said second catalytic layer; and
  a second non-porous, conductive separator plate secured to a second face of said second gas distribution layer.

21. The fuel cell of claim 20 wherein said leg portion has a first width and said barrier portion has a second width, said second width being less than said first width.

22. The fuel cell of claim 20 wherein each of said second plurality of porous gas flow channels comprise a leg portion having a third porosity extending transversely through said second gas distribution layer and a barrier portion disposed on each side of said leg portion, said barrier portion having a fourth porosity which is substantially less that said third porosity to channelize the flow of reactant gases through each of said second plurality of porous reactant gas flow channels.

23. The fuel cell of claim 22 wherein said leg portion has a third width and said barrier portion has a fourth width, said fourth width being less than said third width.

* * * * *